No. 624,678. Patented May 9, 1899.
J. PLANES.
COUPLING DEVICE FOR VEHICLES.
(Application filed Oct. 4, 1898.)
(No Model.)
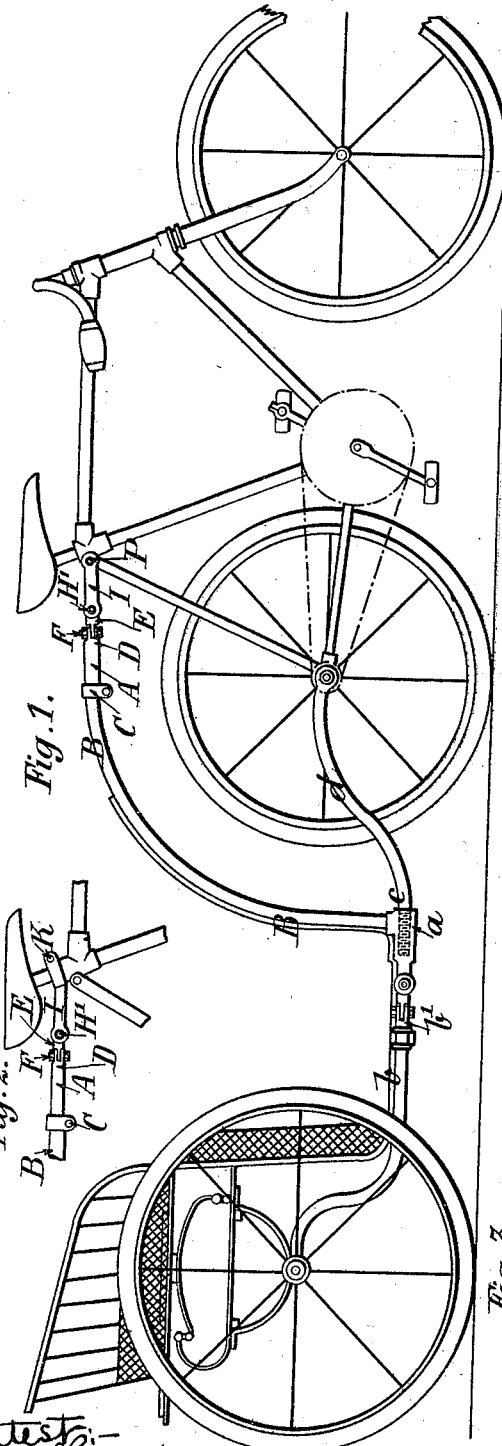
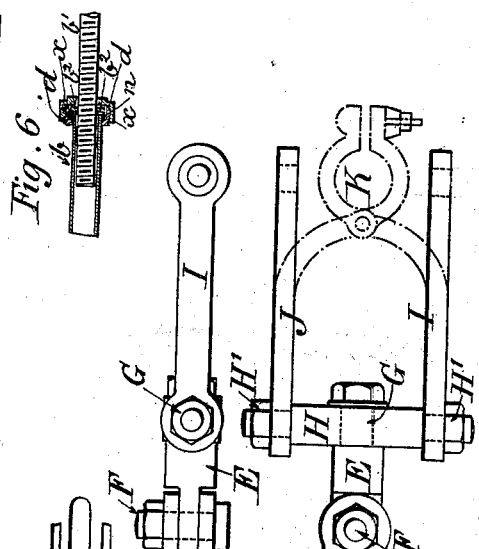
Inventor:
Joseph Planes

UNITED STATES PATENT OFFICE.

JOSEPH PLANES, OF NEUILLY, FRANCE.

COUPLING DEVICE FOR VEHICLES.

SPECIFICATION forming part of Letters Patent No. 624,678, dated May 9, 1899.

Application filed October 4, 1898. Serial No. 692,640. (No model.)

*To all whom it may concern:*

Be it known that I, JOSEPH PLANES, a citizen of the Republic of France, residing in Neuilly, St. Seine, (Seine,) France, have invented a new and useful Improvement in Coupling Devices for Vehicles, which is fully set forth in the following specification.

This invention relates to a novel device for connecting a carriage (of the basket or other suitable type) to a vehicle, which is designed to draw it, such vehicle being either a bicycle, tricycle, or motor-cycle.

To enable the invention to be fully understood, I have illustrated it by way of example in the accompanying drawings, in which—

Figure 1 is an elevation of a basket-carriage connected to a bicycle by means of my novel coupling device. Figs. 2 and 3 are modifications of the method of coupling illustrated in Fig. 1. Figs. 4 and 5 are views drawn to a larger scale and being respectively a longitudinal elevation and a plan of the main part of my coupling device, and Figs. 6 and 7 are detail views.

In order that the vehicle which draws the carriage shall not be hindered in its dragging and steering movements, a coupling device which allows it liberty of movement whatever the roughness or unevenness of the path and which at the same time provides a perfectly safe connection between the two vehicles is indispensable. My coupling device (represented in detail in Figs. 4 and 5 and in its different forms in Figs. 1, 2, and 3) fully answers to these requirements.

As will be obvious from an examination of the said figure, the device comprises a rod A, which may be hollow or solid and which fits into the tube forming the shaft or pole B $b$ of the carriage to be drawn, being connected to this shaft B by a clamping-collar C, forming a part of the latter. The opposite end of the rod A to that forming this joint is made with a fork D, in which is pivoted a bar E upon a pivot F, which at the same time forms a clamping-bolt. This joint allows of movement in the horizontal plane—that is to say, it permits the motive vehicle to be steered. The part E is provided at the end opposite to the bolt F with a journal G, which passes perpendicularly through the center of a bar H, to which it is connected. This connection of the bar E with the rod A enables the horizontal movements to which the two vehicles are subjected by reason of the roughness of the route traversed to be independent of one another.

The transverse bar H is formed at each end with a journal H', each of which journals receives one of the ends of two rods I J, the other ends of which are fixed to the motor-vehicle.

The pole or shaft of the carriage is composed of two parts B $b$, connected by a brazed socket $a$, internally screw-threaded for receiving the end of a fork $d$, which embraces the rear wheel and the two legs of which are secured to the axle of the said wheel. This fork, which is detachable, has for its object to give increased rigidity to the whole arrangement. The part $b$ of the shaft or pole is connected to the socket $a$ by means of a double joint, forming a universal joint of the kind employed in the upper part of the shaft B. (See Figs. 1 and 7.)

The point of connection of the rods I J to the motive vehicle can obviously be varied according to the nature and construction of the vehicle; but in any case it must be suitably chosen and be sufficiently high to insure the stability and the equilibrium of the whole arrangement. I preferably arrange that the point of attachment is immediately below the saddle, either at the bolt for clamping the saddle-pin, as represented in Fig. 1, or at the seat-stay itself, as illustrated in Fig. 2.

In the case where the clamp P of the seat-stay is chosen as the point of attachment, as illustrated in Fig. 1, the coupling devices will be constructed as above described and represented in Figs. 1, 4, and 5, the ends of the two rods I J being placed, respectively, between the head and nut of this bolt and the attachment-lugs of the tubes which connect the head of the seat-stay to the rear wheel.

In the case where the coupling is fixed to the seat-stay itself the rods I J are modified as represented in dotted lines in Fig. 5—that is to say, they are formed at their attachment ends with a collar K, which enables the coupling to be effected as illustrated in Fig. 2.

When it is a question of coupling the vehicle to a motor cycle or tricycle, for example, of any suitable construction, the modification of my coupling arrangement represented in plan in Fig. 3 can be advantageously adopted. In this modification one point of attachment is supposed to be taken over the two vertical supports M M', which connect the motor to the frame of the motorcycle. The two rods I J have a curved or arched form for passing freely at each side of the motor and terminate in two forks N N', which are connected to the two vertical supports M M' by means of bolts O O'.

For the purpose of avoiding the liability to injury to the carriage by the loss of equilibrium or by the upsetting of the motive vehicle the shaft of the said carriage is formed in two parts $b$ $b'$, which are jointed, as illustrated in Fig. 1 and in detail in Fig. 6, in such a manner that the one part can turn freely in the other. In the method of connecting these two parts illustrated by way of example the female portion $b$ is furnished at its end with a flange $n$, and the male part $b'$ is screw-threaded externally for a part of its length, the screw-threaded portion being furnished with a ring $b^2$, which is suitably regulated so that the part $b'$ extends into the part $b$ sufficiently to make a joint. This ring $b^2$ serves as a flange for the part $b'$. The connection of the parts $b$ $b'$ is effected by means of a shouldered socket $d$, which is applied against one of the flanges, and by the flanged nut $x$, which is applied against the other flange and screws onto the screwed socket. With an arrangement of this kind free play can be allowed to the rotation of the part $b'$ in the part $b$, or the two parts can be fixed in position by tightening the flanges by means of the nut $x$. The seat of the carriage is open and is provided at $z$ with a recess, in which there is usually placed a flexible seat, upon which the occupant seats himself. This seat can be removed and serve as an ordinary seat when required.

I claim—

1. As a means of coupling a carriage to a bicycle, tricycle or like motive vehicle, the combination of a socket connected to the carriage at a point below its center of gravity by a universal joint, a fork united to said socket and to the axle of the motive vehicle, and a shaft or bar also united to said socket and connected to the motive vehicle at a point above its axle.

2. As a means of coupling a carriage to a bicycle, tricycle or like motive vehicle the combination of a fork secured to the axle of the motive vehicle to turn in a vertical plane, a shaft or bar secured to said fork and to said vehicle by a universal joint above the fork, and a universal-joint connection between the carriage and the united shaft and fork.

In testimony whereof I have signed this specification in the presence of two subscribing witnesses.

JOSEPH PLANES.

Witnesses:
EDWARD P. MACLEAN,
ALEXANDRE MATHIEN.